Patented Jan. 20, 1953

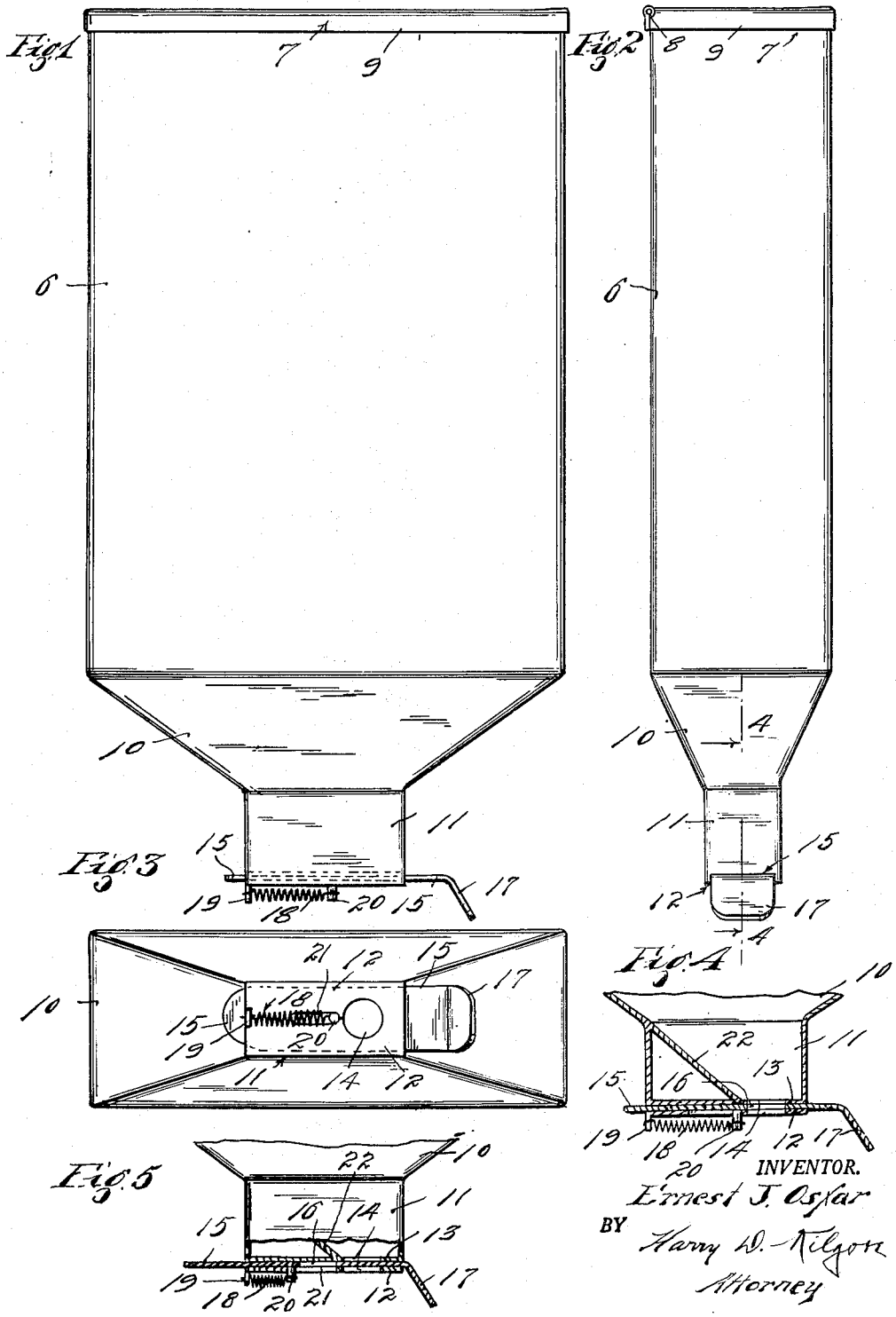

2,626,089

UNITED STATES PATENT OFFICE 2,626,089

POWDERED AND GRANULATED MATERIAL CONTAINER WITH SELF-CLOSING DISPENSING VALVE

Ernest J. Osfar, Minneapolis, Minn.

Application January 15, 1947, Serial No. 722,172

1 Claim. (Cl. 222—511)

My invention relates to improvements in hand-operated dispensers for dispensing bulk powdered and granular materials such as soap.

The object of this invention is to provide a simple, highly efficient and inexpensive dispenser.

To the above end, the invention consists of the novel construction and arrangement of parts hereinafter described and defined in the claim.

In the accompanying drawing, which illustrates the invention, like characters indicate like parts throughout the several views.

Referring to the drawing:

Fig. 1 is a side elevational view of the improved dispenser;

Fig. 2 is an end elevational view of the same;

Fig. 3 is a bottom plan view;

Fig. 4 is a fragmentary detail view in section taken on the line 4—4 of Fig. 2; and Fig. 5 is a view corresponding to Fig. 4, in part, showing the cut-off slide closed.

The numeral 6 indicates a rectangular box-like container for holding bulk powdered or granular material to be dispensed. This container 6 has a displaceable cover 7 hinged at 8 to the container 6 and having a flange 9 capping said container. The container 6 has a hopper bottom 10 that empties into a rectangular box-like trap 11.

The trap 11 has a bottom member 12 and a false bottom member 13 having annular discharge passageways 14 that are vertically spaced the one above the other. A cut-off slide 15 is mounted between the two bottom members 12 and 13 for endwise sliding movement. This slide 15 has a discharge passageway 16 that may be brought into and out of registration with the passageways 12 and 13, by moving the slide 15 endwise. The front end portion of the slide 15, outwardly of the trap 11, is bent downwardly to afford a finger-piece 17.

The slide 15 is yieldingly held retracted by a coiled spring 18 with its discharge passageway 16 out of registration with the passageways 12 and 13 and rearwardly thereof. In this position of the slide 15, it closes the passageway 12 and 13. The spring 18 is anchored to a depending lug 19, on the bottom member 12, at the back of the trap 11, and attached to a depending pin 20 on the slide 15. This pin 20 works in a slot 21 in the bottom member 12.

Within the trap 11 is an inclined apron 22 which directs material in said trap into the passageways 12 and 13.

Any suitable means, not shown, may be provided for mounting the dispenser on a wall or other support.

Obviously, the hopper bottom 10 keeps the trap 11 filled with material as long as there is a supply in the container 6.

From what has been said, it will be understood that the dispenser described is capable of modifications as to details of construction and arrangement within the scope of the invention herein disclosed and claimed.

What I claim is:

In a dispenser of the class described, a container applicable to a wall and having a cover-equipped top and a hopper bottom terminating in a rectangular trap having upper and lower bottom members provided at one of their end portions with aligned upper and lower discharge openings, an inclined apron in the trap leading from the hopper to the upper discharge opening, a cut-off slide between said bottom members and having a discharge opening arranged to be brought into registration with the discharge openings in said bottom members to form a continuous passageway from the trap to the exterior of the container, said lower bottom member having therein a longitudinal slot, a depending pin secured to the slide and working in the slot, said pin affording a stop for the slide when its discharge opening is aligned with the discharge openings in said bottom members, said lower bottom member having a depending lug spaced from the inner end of the slot, and a coiled spring between the pin and the lug and normally holding the slide retracted, the outer end portion of the slide being bent to afford a finger piece.

ERNEST J. OSFAR.

REFERENCES CITED

The following references are of record in the file of this patent:

UNITED STATES PATENTS

| Number | Name | Date |
|---|---|---|
| 848,015 | Dilworth | Mar. 26, 1907 |
| 1,154,391 | Gee | Sept. 21, 1915 |
| 1,192,228 | Rhodes | July 25, 1916 |
| 1,199,522 | Bigoney | Sept. 26, 1916 |
| 1,683,832 | Lindgren | Sept. 11, 1928 |
| 1,730,870 | Wilson | Oct. 8, 1929 |
| 1,980,049 | Gainer | Nov. 6, 1934 |
| 1,989,575 | Wandel | Jan. 29, 1935 |
| 2,096,259 | Orihel | Oct. 19, 1937 |
| 2,127,092 | Solvad et al. | Aug. 16, 1938 |
| 2,210,596 | Nyden | Aug. 6, 1940 |
| 2,245,523 | Bernhardt | June 10, 1941 |
| 2,328,564 | Lightfoot et al. | Sept. 7, 1943 |